(12) United States Patent
Gulati et al.

(10) Patent No.: US 9,152,588 B2
(45) Date of Patent: Oct. 6, 2015

(54) RACE-FREE LEVEL-SENSITIVE INTERRUPT DELIVERY USING FABRIC DELIVERED INTERRUPTS

(71) Applicant: Apple Inc., Cupertino, CA (US)

(72) Inventors: Manu Gulati, Saratoga, CA (US); Erik P Machnicki, San Jose, CA (US); Deniz Balkan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 13/653,151

(22) Filed: Oct. 16, 2012

(65) Prior Publication Data

US 2014/0108688 A1    Apr. 17, 2014

(51) Int. Cl.
*G06F 13/24* (2006.01)
*G06F 13/26* (2006.01)

(52) U.S. Cl.
CPC ............... *G06F 13/24* (2013.01); *G06F 13/26* (2013.01); *Y02B 60/1228* (2013.01)

(58) Field of Classification Search
USPC .................................................. 710/260–269
See application file for complete search history.

(56) References Cited

U.S. PATENT DOCUMENTS

| | | | |
|---|---|---|---|
| 5,187,781 A | 2/1993 | Heath | |
| 5,261,107 A | 11/1993 | Klim et al. | |
| 5,819,096 A | 10/1998 | Nelson et al. | |
| 6,145,047 A | 11/2000 | Garinger et al. | |
| 6,604,161 B1 | 8/2003 | Miller | |
| 6,708,241 B1 * | 3/2004 | Futral | 710/260 |
| 6,735,655 B1 | 5/2004 | Chilton | |
| 7,003,611 B2 | 2/2006 | Arndt | |
| 7,181,559 B2 * | 2/2007 | Barth et al. | 710/263 |
| 7,257,658 B2 * | 8/2007 | Winkler et al. | 710/266 |
| 7,685,347 B2 | 3/2010 | Gibbs | |
| 7,805,557 B2 | 9/2010 | Kimelman et al. | |
| 8,032,686 B2 | 10/2011 | O'Brien et al. | |
| 8,055,827 B2 * | 11/2011 | Serebrin et al. | 710/260 |
| 8,135,884 B1 | 3/2012 | Sullam et al. | |
| 8,166,223 B2 | 4/2012 | Bennett | |
| 8,234,432 B2 * | 7/2012 | Serebrin | 710/268 |
| 8,725,914 B2 * | 5/2014 | Brownlow et al. | 710/48 |
| 9,009,377 B2 | 4/2015 | Machnicki et al. | |

(Continued)

OTHER PUBLICATIONS

Office Action from U.S. Appl. No. 13/666,132, issued Aug. 29, 2014, pp. 1-9.

(Continued)

*Primary Examiner* — Raymond Phan
(74) *Attorney, Agent, or Firm* — Meyertons, Hood, Kivlin, Kowert & Goetzel, P.C.; Lawrence J. Merkel (57) ABSTRACT

In an embodiment, a system includes at least one peripheral device, an interrupt controller, a memory controller, at least one CPU, and an interrupt message circuit coupled to the peripheral device. The interrupt message circuit may be coupled to receive the interrupt signal from the peripheral device, and may be configured to generate an interrupt message for transmission on a communication fabric. In some embodiments, there may be multiple peripherals which have independent paths through the fabric for memory operations to the memory controller. Each such peripheral may be coupled to an instance of the interrupt message circuit. In an embodiment, the interrupt is level sensitive. The interrupt message circuit may be configured to transmit interrupt set messages an interrupt clear messages to the interrupt controller, to indicate the levels.

23 Claims, 7 Drawing Sheets

(56) References Cited

U.S. PATENT DOCUMENTS

| | | |
|---|---|---|
| 2005/0144346 A1 | 6/2005 | Barth et al. |
| 2005/0228923 A1* | 10/2005 | Zimmer et al. ............... 710/269 |
| 2005/0289271 A1 | 12/2005 | Martinez et al. |
| 2006/0047877 A1 | 3/2006 | Winkler et al. |
| 2006/0253619 A1* | 11/2006 | Torudbakken et al. ......... 710/31 |
| 2006/0282591 A1* | 12/2006 | Krithivas ...................... 710/269 |
| 2008/0126617 A1 | 5/2008 | Brownlow et al. |
| 2009/0164739 A1 | 6/2009 | Harikumar et al. |
| 2010/0180060 A1 | 7/2010 | Biran |
| 2011/0179413 A1 | 7/2011 | Subramanian et al. |
| 2012/0221757 A1 | 8/2012 | Craddock et al. |

OTHER PUBLICATIONS

PCI Local Bus Specification Revision 2.3& 3.0 Draft, MSI-X ECN, Message Signaled Interrupts, Joe Cowan, Hewlett-Packard Company, Jun. 10, 2003, 23 Pages.

U.S. Appl. No. 13/666,132, filed Nov. 1, 2012, inventor Machnicki et al.

* cited by examiner

RACE-FREE LEVEL-SENSITIVE INTERRUPT DELIVERY USING FABRIC DELIVERED INTERRUPTS

BACKGROUND

1. Field of the Invention

This invention is related to the field of interrupts, and more particularly to delivering interrupts over a communication fabric in a system such as a system on a chip (SOC).

2. Description of the Related Art

Computing systems generally include one or more processors that serve as central processing units (CPUs), along with one or more peripherals that implement various hardware functions. The CPUs execute the control software (e.g. an operating system) that controls operation of the various peripherals. The CPUs can also execute applications, which provide user functionality in the system. Additionally, the CPUs can execute software that interacts with the peripherals and performs various services on the peripherals behalf.

The peripherals can cause the CPUs to execute software on their behalf using interrupts. Generally, the peripherals issue an interrupt to the CPU, typically by asserting an interrupt signal to an interrupt controller that controls the interrupts going to the CPU. The interrupt causes the CPU to stop executing its current software task, saving state for the task so that it can be resumed later. The CPU can load state related to the interrupt, and begin execution of an interrupt service routine. The interrupt service routine can be driver code for the peripheral, or may transfer execution to the driver code as needed. Generally, driver code is code provided for a peripheral device to be executed by the CPU, to control and/or configure the peripheral device.

In some cases, the peripheral writes data to memory to be operated upon by the interrupt service routine ("interrupt code") and/or the driver code. Accordingly, the peripheral may transmit the write operations and assert the interrupt to the CPU. This procedure creates a race condition between the write operations propagating to memory and the execution of the interrupt code/driver code. More particularly, the write operations may not have reached the point of "globally visibility" to the CPU. If the writes are globally visible, the data written by the write to memory will be returned by a read of the same memory location, even if the writes have not actually reached memory yet. If the code begins executing before the writes are globally visible, the code may read the previous values from memory (prior to the writes), which could lead to erroneous operation.

SUMMARY

In an embodiment, a system includes at least one peripheral device configured to assert an interrupt signal to interrupt a CPU or CPUs, an interrupt controller configured to present interrupts to the CPU(s), a memory controller, the CPU(s), and an interrupt message circuit coupled to the peripheral device. The interrupt message circuit may be coupled to receive the interrupt signal from the peripheral device, and may be configured to generate an interrupt message for transmission on a communication fabric that couples the interrupt controller, CPU, memory controller, and peripheral device. More particularly, the interrupt message may be transmitted after the corresponding write operations on the interrupt fabric. In some embodiments, the interrupt message circuit may track the corresponding write operations and ensure that the write operations are globally visible prior to transmitting the interrupt message. In other embodiments, the fabric is defined to ensure ordering of operations transmitted over the fabric, and the interrupt message circuit may insert the interrupt message after the write operations. In this fashion, in some embodiments, the race condition between the write operations and the interrupt delivery to the processor may be alleviated.

In some embodiments, there may be multiple peripherals which have independent paths through the fabric for memory operations to the memory controller. Each such peripheral may be coupled to an instance of the interrupt message circuit, which may transmit interrupt messages on the fabric on behalf of the respective peripheral.

In an embodiment, the interrupt is level sensitive. The interrupt message circuit may be configured to transmit interrupt set messages in response to low to high transitions of the interrupt signal. The interrupt message circuit may further be configured to transmit interrupt clear messages in response to high to low transitions of the interrupt signal. The interrupt controller may virtualize the level of the interrupt signal responsive to the messages. Other level-sensitive signals may similarly be virtualized using such a mechanism. In some embodiments, the interrupt messages may be combined with software clearing mechanisms to further alleviate the race condition. In some embodiments, the interrupt message circuit may be configured to respond to a power up event by sensing a current level of the interrupt signal, and transmitting a corresponding interrupt message to the interrupt controller. The interrupt message may ensure that the interrupt controller has the correct state for the interrupt signal after a power down/power up sequence performed to conserve power.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
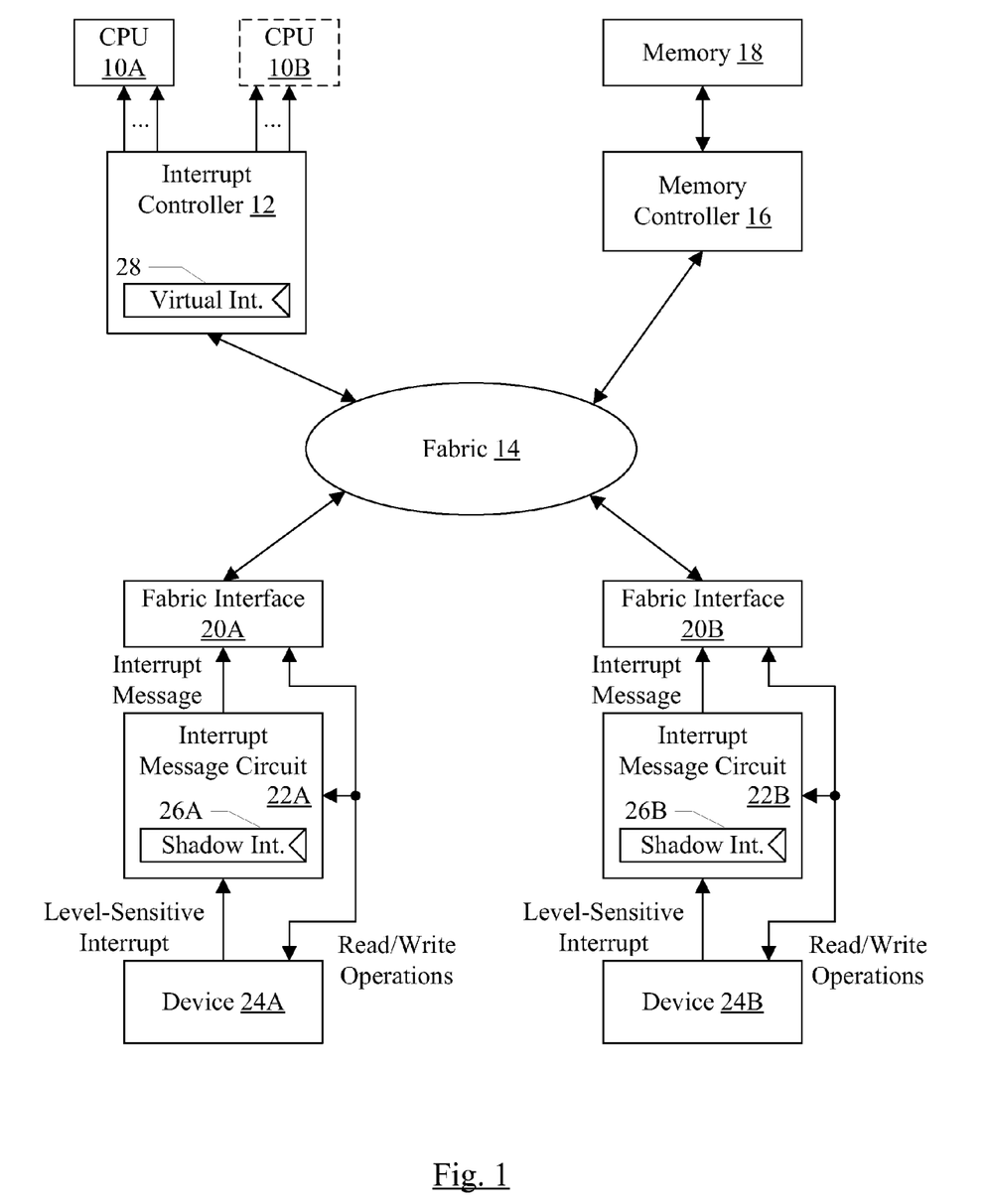
FIG. 1 is a block diagram of one embodiment of a system including devices and interrupt message circuits configured to transmit interrupt messages.

Turning now to FIG. 1, a block diagram of one embodiment of a system is shown. In the embodiment of FIG. 1, the system includes a one or more CPUs 10A-10B, an interrupt controller 12, a communication fabric 14, a memory controller 16, a memory 18, fabric interface circuits 20A-20B, interrupt message circuits 22A-22B, and peripheral devices 24A-24B. The CPUs 10A-10B are coupled to the interrupt controller 12, which is coupled to the communication fabric (or more briefly "fabric") 14. The memory 18 is coupled to the memory controller 16, which is further coupled to the fabric 14. The fabric interface circuits 20A-20B are coupled to the fabric 14 and respective interrupt message circuits 22A-22B and peripheral devices 24A-24B. The interrupt message circuits 22A-22B are also coupled to respective devices 24A-24B. In one embodiment, the components illustrated in FIG. 1 except for the memory 18 may be integrated onto a single semiconductor substrate as an SOC. Other embodiments may include the memory 18 on the SOC as well. In yet other embodiments, one or more of the devices 24A-24B may not be included on the SOC, but there may be a peripheral interface circuit configured to communicate on a peripheral interface to the external device 24A-24B. Still other embodiments may implement any amount of discrete circuitry.

A given peripheral device 24A-24B may generate various memory operations (read and write operations) to read data from and write data to the memory 18. Read operations may specify a transfer of data from the memory 18 to the device 24A-24B; and write operations may specify a transfer of data from the device 24A-24B to the memory 18. The memory operations may include an address of the location in memory to be read/written, and various other attributes such as the size of the transfer, cacheability, coherency, etc. The device 24A-24B may transmit the operations to the respective fabric interface circuit 20A-20B to transmit over the fabric 14 to the memory controller 16. The interrupt message circuit 22A-22B may also be coupled to receive the memory operations, to monitor for interrupt message insertion.

The device 24A-24B may also be configured to generate a level-sensitive interrupt. The interrupt signal may be received by the respective interrupt message circuit 22A-22B (e.g. the conductor carrying the signal may be coupled to the interrupt message circuit 22A-22B). Generally, the interrupt message circuit 22A-22B may be configured to issue interrupt messages to convey the status of the level-sensitive interrupt signal. A level-sensitive interrupt signal may be a signal that indicates the request for interrupt (or lack of request) via the level currently transmitted on the signal. For example, an active-high level-sensitive interrupt signal may be asserted high to indicate a request for interrupt and deasserted low to indicate no request for interrupt. An active-low level-sensitive interrupt signal may be asserted low to indicate a request for interrupt and deasserted high to indicate a lack of request for interrupt. Thus, an interrupt request may be indicated by assertion of the level-sensitive interrupt signal, and the continued assertion indicates that the request is still active. Deassertion of the level-sensitive interrupt signal indicates that the interrupt is not requested (either because it has been serviced, or the interrupt is no longer needed for some device-specific reason). By way of contrast, an edge-triggered interrupt signal indicates that an interrupt is requested by the transition from low to high (active-high). The edge-triggered signal does not have a defined meaning for the deassertion of the signal, and does not require continued assertion of the signal to indicate that the interrupt is still requested. Thus, an edge-triggered interrupt signal may be a pulse indicating a request for interrupt. Once an edge-triggered interrupt is requested then the interrupt will be delivered, even if the interrupt is no longer needed/desired by the device that asserted the interrupt.

The interrupt messages may be transmitted over the fabric 14 using the same path as the memory operations from the corresponding device 24A-24B. In the embodiment of FIG. 1, for example, the same fabric interface circuit 20A-20B that is used by the corresponding device 24A-24B may be used to transmit the interrupt message. In this fashion, the interrupt message circuit 22A-22B may not add a new master to the fabric 14. Additionally, devices which use level-sensitive interrupt signals and which do not generate interrupt messages may not require redesign to be used in the system. Still further, global routing of the level-sensitive interrupt wires between devices and the interrupt controller may be avoided through the use of the interrupt messages.

The interrupt message circuit 22A-22B may have its own port on the fabric interface circuit 20A-20B, or may share the port on the fabric interface circuit 20A-20B. In either case, the interrupt message circuit 22A-22B may monitor the operations from the corresponding device 24A-24B to ensure that current operations have been transmitted, then may inhibit further transmission by the corresponding device 24A-24B to transmit the interrupt message. Transmitting the interrupt message over the fabric 14 using the same path as the memory operations (at least to the point at which the paths to the interrupt controller 12 and the memory controller 16 diverge in the fabric 14) may ensure that the interrupt message is transmitted after the memory operations that are associated with the interrupt. If the fabric 14 ensures that operations complete in order, the memory operations that precede the interrupt may be globally visible prior to the interrupt message reaching the interrupt controller 12. In other embodiments, the interrupt message circuits 22A-22B may monitor the preceding memory operations for global visibility prior to transmitting the interrupt message or the devices 24A-24B may ensure global visibility prior to asserting the interrupt.

The interrupt messages from different interrupt message circuits 22A-22B may travel through the fabric 14 on paths that are at least in part independent of each other. That is, at some point in the fabric 14 the paths of the interrupt messages may converge since they are traveling to the same destination, but a portion of the path may be independent since the sources are different.

In an embodiment, the interrupt message circuit 22A-22B may include shadow interrupt flop(s) 26A-26B. The flops 26A-26B may generally be any clocked storage devices (e.g. flops, latches, registers, etc.), and may retain the level of the level-sensitive interrupt signal(s) that has most recently been transmitted to the interrupt controller 12 by the interrupt message circuit 22A-22B. The level in the flops may be compared to the current level to detect a change in level, which may lead to the generation of an interrupt message. Accordingly, the receiver of the interrupt messages (the interrupt controller 12 in this case) may be informed of each change in level and thus may maintain a virtual copy of the level-sensitive interrupt without receiving the actual wire on which the level-sensitive interrupt signal is carried.

For example, the interrupt messages from the interrupt message circuits 22A-22B may be delivered by the fabric 14 to the interrupt controller 12. The interrupt controller 12 may be configured to maintain a virtual interrupt for each level-sensitive interrupt in virtual interrupt flops 28. Again, the flops 28 may be any clocked storage device, including the examples given above. The interrupt controller 12 may be configured to present interrupts to the CPUs 10A-10B, based on the interrupts that have been requested. As illustrated in FIG. 1, the interrupt controller 12 may be configured to assert one or more interrupts to each CPU 10A-10B. In one embodiment, the device interrupts may be presented to the CPU 10A-10B as one common interrupt signal, and when the CPU 10A-10B acknowledges the interrupt an interrupt vector may be provided. The interrupt vector may be specific to the requesting device. Other interrupts, such as non-maskable interrupts or high priority interrupts, may have separate interrupt signals for presentation to the CPUs 10A-10B.

In some embodiments, the interrupt controller 12 may be configured to present interrupts to non-CPU processors in the system. The non-CPU processors may be special purpose processors such as input/output (I/O) processors dedicated to certain handling I/O interrupts while the CPUs perform other tasks.

An interrupt message may be a communication on the fabric 14 that communicates an interrupt signal value to the interrupt controller 12. The interrupt message may appear to be similar to a memory operation (e.g. a write operation), but the routing of the message may not be to the memory controller. The write operation may have a designated address that is interpreted by the system as an interrupt message. Alternatively, in a packet-based system, an interrupt message packet may include the interrupt controller 12 as the destination of the packet. Identifying information for the interrupt signal may be provided in the message, or may be inherent in the source of the message. More particularly, in an embodiment, the interrupt messages for the level-sensitive interrupts may include set messages and clear messages. The interrupt set message may be transmitted in response to detecting a change in level from deasserted to asserted (e.g. low to high, for an active high signal). The interrupt clear message may be transmitted in response to detecting a change in level from asserted to deasserted (e.g. high to low, for an active high signal). The interrupt controller 12 may be configured to set the virtual interrupt in response to interrupt set messages and clear the virtual interrupt in response to interrupt clear messages.

The devices 24A-24B may generally be any type of peripheral device or interface, implementing any hardware functionality included in the system other than the CPUs. For example, the devices 24A-24B may include video peripherals such as cameras, camera interfaces, image processors, video encoder/decoders, scalers, rotators, blenders, graphics processing units, display controllers, etc. The devices 24A-24B may include audio peripherals such as microphones, speakers, interfaces to microphones and speakers, audio processors, digital signal processors, mixers, etc. The devices 24A-24B may include interface controllers for various interfaces external to the SOC (for SOC implementations) including interfaces such as Universal Serial Bus (USB), peripheral component interconnect (PCI) including PCI Express (PCIe), serial and parallel ports, etc. The devices 24A-24B may include networking peripherals such as media access controllers (MACs). Any set of hardware may be included. There may be more than two devices 24A-24B in a given system, two are illustrated merely to highlight certain aspects of an embodiment of the system.

The fabric 14 may be any communication interconnect and protocol for communicating among the components of the system. The fabric 14 may be bus-based, including shared bus configurations, cross bar configurations, and hierarchical buses with bridges. The fabric 14 may also be packet-based, and may be hierarchical with bridges, cross bar, point-to-point, or other interconnects. The fabric interface circuits 20A-20B may be part of the fabric 14, and may couple to other such circuits within the fabric 14, in an embodiment.

The interrupt controller 12 may be configured to manage interrupts in the system. The interrupt controller 12 may be configured to receive the interrupts, record them, and present them to the CPUs 10A-10B. The CPUs 10A-10B may be configured to signal interrupts (e.g. inter processor interrupts (IPIs)) through the interrupt controller 12 as well. The interrupt controller 12 may be configured to receive interrupt acknowledgements from the CPUs 10A-10B (and other non-CPU processors to which the interrupt controller 12 presents interrupts, in some embodiments) and may provide interrupt vectors in response to the acknowledgements. The interrupt controller 12 may further receive read/write operations from the interrupted processors to update interrupt state in the interrupt controller 12 (e.g. during execution of interrupt service routine code and/or device driver code).

The memory controller 16 may generally include the circuitry for receiving memory requests from the other components of the system and for accessing the memory 18 to complete the memory requests. The memory controller 16 may be configured to access any type of memory 18. For example, the memory 18 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

The CPUs 10A-10B may implement any instruction set and any configuration. The CPUs 10A-10B may be superscalar or scalar, pipelined, in order or out of order, speculative or non-speculative, etc. Any configuration and design may be used. At least one CPU 10A-10B may be included, and more than one (e.g. two as shown in FIG. 1, or more) CPUs may be included.

Figure 2:
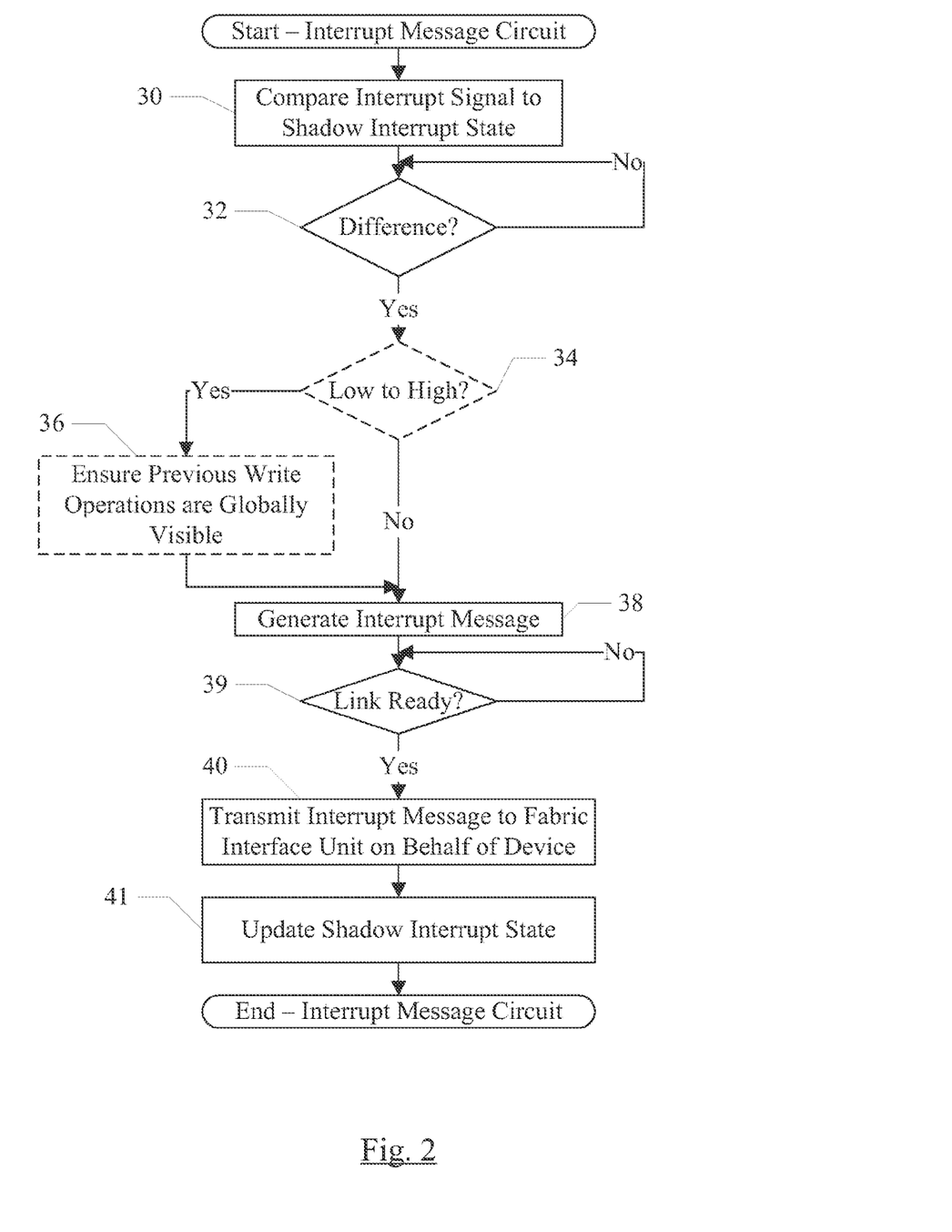
FIG. 2 is a flowchart illustrating operation of one embodiment of the interrupt message circuits.

Turning now to FIG. 2, a flowchart is shown illustrating operation of one embodiment of an interrupt message circuit 22A-22B. While the blocks are shown in a particular order for ease of understanding, other orders may be used. Blocks may be performed in parallel in combinatorial logic in the interrupt message circuit 22A-22B. Blocks, combinations of blocks, and/or the flowchart as a whole may be pipelined over multiple clock cycles. The operation illustrated in FIG. 2 pertains to one level-sensitive interrupt signal. Similar operation may be performed in parallel for each level-sensitive interrupt signal managed by the interrupt message circuit 22A-22B. The interrupt message circuit 22A-22B may be configured to implement the operation shown in FIG. 2.

The interrupt message circuit 22A-22B may be configured to compare the level of the interrupt signal to the corresponding shadow interrupt state (e.g. the level of the interrupt signal when last transmitted to the interrupt controller 12 by the interrupt message circuit 22A-22B, stored in the flop 26A-26B) (block 30). If there is a difference in the shadow interrupt state and the current level (decision block 32, "yes" leg), the interrupt message circuit 22A-22B may optionally determine if each preceding write operation issued by the corresponding device 24A-24B is globally visible (decision block 34, "yes" leg and block 36). Blocks 34 and 36 may be optional because some embodiments of the fabric 14 may ensure by design that the preceding write operations are globally visible prior to the interrupt message from the interrupt message circuit 22A-22B reaching the interrupt controller 12. For example, the fabric 14 may include a coherence point at which memory operations become globally visible, and the interrupt messages may travel through the coherence point behind write operations issued by the device 24A-24B, thus ensuring that the writes will be globally visible prior to the interrupt message reaching the interrupt controller. Alternatively, the device 24A-24B may be configured to ensure that the memory operations are globally visible prior to asserting the interrupt. Blocks 34 and 36 may be eliminated in such embodiments as well.

The interrupt message circuit 22A-22B may be configured to generate an interrupt message (block 38). The interrupt message circuit 22A-22B may wait until the link is ready for insertion of the interrupt message (decision block 39). The link may be viewed as ready if the current memory operations from the device 24A-24B have been sent (e.g. read requests and write requests and write data have been sent). When the link is ready (decision block 39, "yes" leg), the interrupt message circuit 22A-22B may be configured to inhibit transmission of additional memory operations from the device 24A-24B to transmit the generated interrupt message on the fabric 14 on behalf of the device 24A-24B (block 40). After the interrupt message has been sent, the interrupt message circuit 22A-22B may permit transmission of additional memory operations from the device 24A-24B. In response to transmitting the interrupt message, the interrupt message circuit 22A-22B may update the shadow interrupt state 26A-26B to reflect the transmitted level (block 41).

Figure 3:
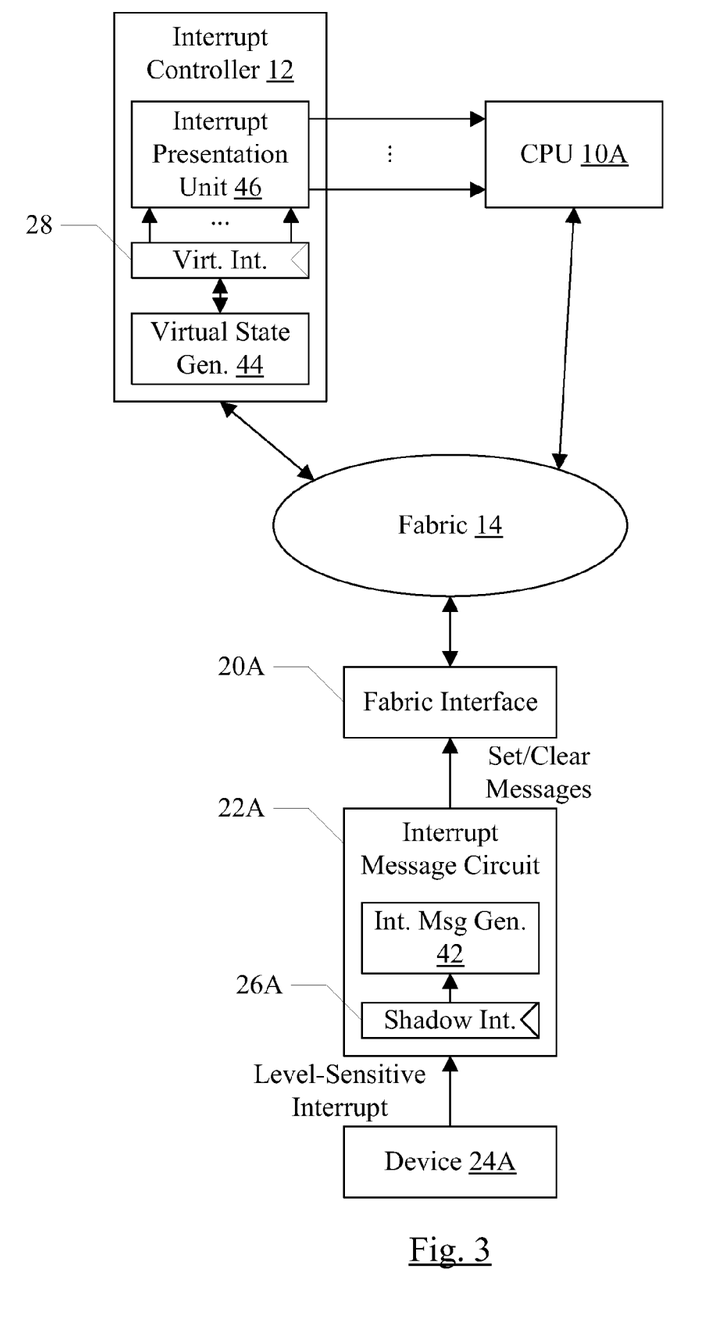
FIG. 3 is a block diagram of a system showing additional details of one embodiment of an interrupt message circuit and one embodiment of an interrupt controller.

FIG. 3 illustrates a portion of the system shown in FIG. 1 in greater detail. More particularly, the interrupt message circuit 22A includes an interrupt message generator 42 configured to generate interrupt set messages and interrupt clear messages responsive to the shadow interrupt state in the flops 26A and the level-sensitive interrupt signal from the device 24A. The interrupt message circuit 22B may have a similar construction. The interrupt controller 12 includes a virtual state generator 44 coupled to receive interrupt messages from the fabric 14. The virtual state generator 44 may be configured to decode the interrupt messages and set or clear virtual interrupt bits in the virtual interrupt state flops 28 for set and clear messages, respectively. The output of the virtual interrupt state flops 28 may be a set of virtual interrupts that behave similar to the various level-sensitive interrupt signals, but delayed slightly in time with respect to the signals. The delay may be the propagation delay of the interrupt messages over the fabric 14. The interrupt presentation unit 46 may receive the virtual interrupt signals and may determine which interrupt to present to the CPU 10A responsive to the virtual interrupt signals and potentially other state such as a priority of the task executing on the CPU 10A, the priority of the interrupts, whether or not interrupts are enabled on the CPU 10A, etc. The interrupt presentation unit 46 may present the interrupt to the CPU 10A (e.g. asserting an interrupt signal to the CPU 10A).

Figure 4:
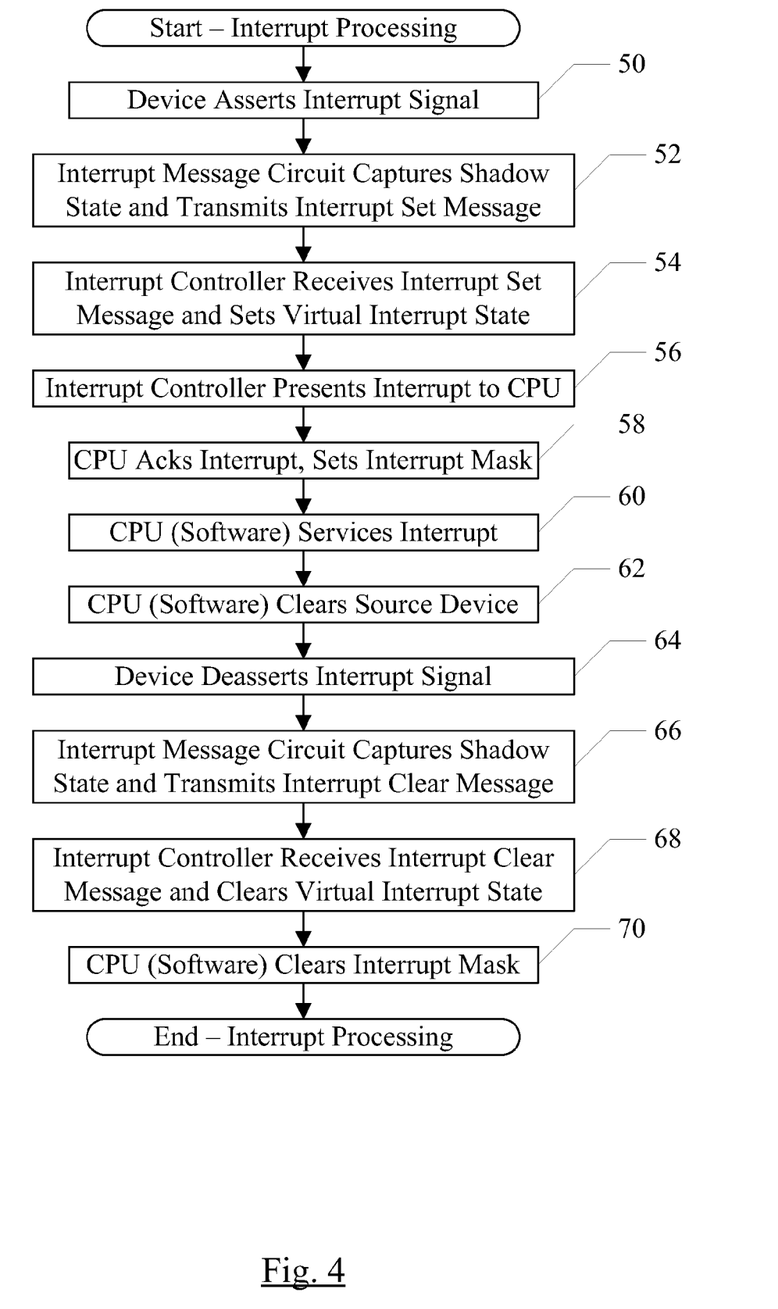
FIG. 4 is a flowchart illustrating one embodiment of interrupt processing.

Turning next to FIG. 4, a flowchart illustrating interrupt processing in one embodiment of the system shown in FIG. 1 to mitigate the possibility of spurious interrupts occurring in the system. While the blocks are shown in a particular order for ease of understanding, other orders may be used. Blocks performed by hardware may be performed in parallel by combinatorial logic in the hardware. Blocks, combinations, of blocks, and/or the flowchart as a whole may be pipelined.

A device 24A-24B may assert its level-sensitive interrupt signal (block 50). The interrupt message circuit 22A-22B coupled to the device 24A-24B may receive the asserted level, and may detect the change in level and generate the set interrupt message to the interrupt controller 12 in response (block 52). The interrupt message circuit 22A-22B may also capture the asserted level in the shadow interrupt state. The interrupt controller 12 may receive the set interrupt message, and may set the corresponding virtual interrupt bit in the virtual interrupt state (block 54). The interrupt controller 12 may select the interrupt to be presented to the CPU 10A (block 56) and may assert the interrupt signal to the CPU 10A. The CPU 10A may acknowledge the interrupt (block 58), which may cause the interrupt controller 12 to set an interrupt mask bit corresponding to the interrupt (in addition to sending an interrupt vector corresponding to the interrupt to the CPU 10A). The CPU 10A may begin executing software in response to the interrupt to service the interrupt (block 60). The software may include interrupt service routine code (or more briefly interrupt code) and/or device driver code corresponding to the device 24A-24B. The interrupt service routine code may include code stored at an address associated with the interrupt vector, to perform initial processing and, in more complex cases, call the device driver code to perform additional operation.

The software executed by the CPU may clear the source device 24A-24B once the interrupt is serviced. Clearing the source device may include various device-dependent operations which inform the device that the reason for the interrupt has been handled. The device may include various control registers that may be read/written by software, and clearing the device may generally include reading/writing the control registers to indicate that the interrupt has been handled (block 62). Responsive to the clearing, the device 24A-24B may deassert its interrupt signal (block 64). The interrupt message circuit 22A-22B may detect the change in level of the interrupt signal and may transmit an interrupt clear message (block 66). The interrupt message circuit 22A-22B may also capture the deasserted interrupt level in the shadow interrupt state. The interrupt controller 14 may receive the interrupt clear message (block 68) and may clear the virtual interrupt bit in the virtual interrupt state that corresponds to the interrupt. The software executing on the CPU 10A may also clear the interrupt mask corresponding to the interrupt (block 70).

Figure 5:
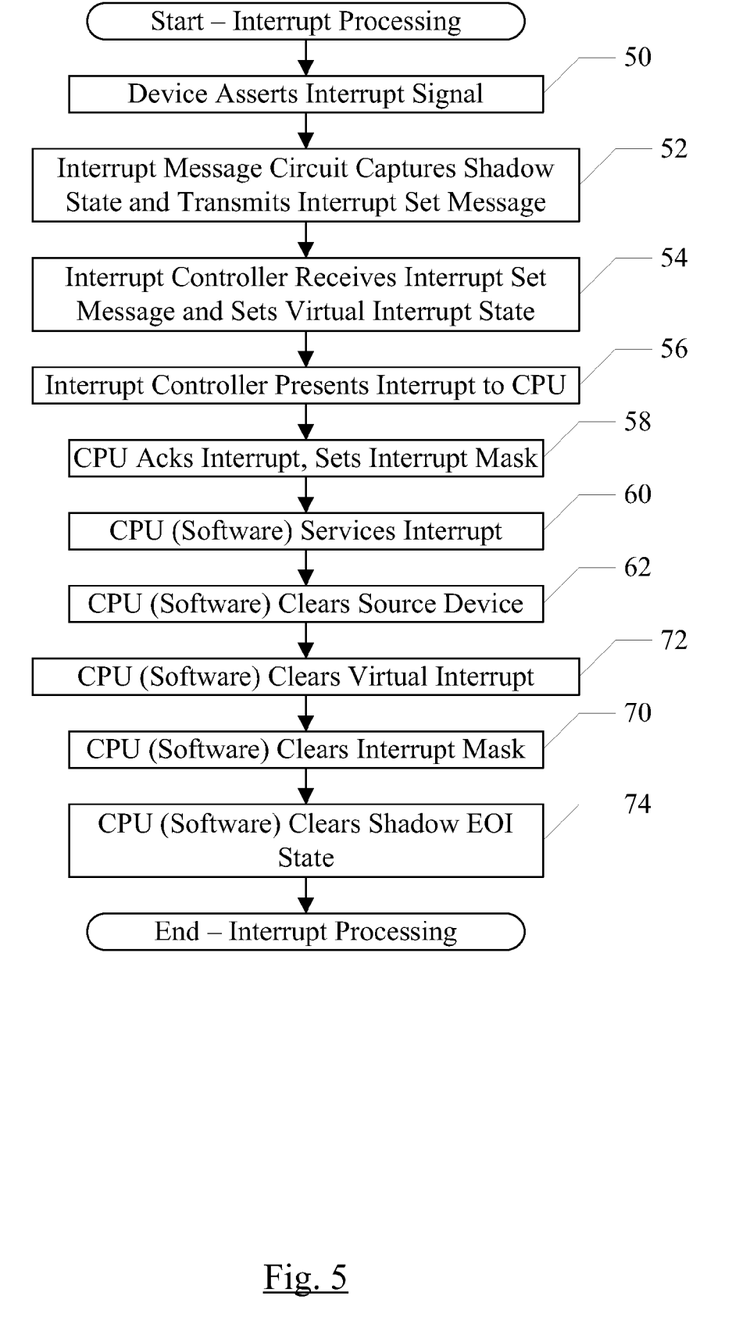
FIG. 5 is a flowchart illustrating another embodiment of interrupt processing.

It is noted that it is possible for the clearing of the interrupt mask (block 70) to occur prior to the interrupt clear message arriving at the interrupt controller 12 (block 68). In such cases, a spurious interrupt may occur. In practice, unless there is congestion in the fabric 14 that stalls the interrupt clear message, the interrupt clear message may typically arrive prior to the clearing of the interrupt mask and the spurious interrupt is therefore unlikely. However, to further mitigate the potential for spurious interrupts, another embodiment of the mechanism for processing interrupts may be used. For example, FIG. 5 illustrates such an embodiment. The processing of FIG. 5 may initially be similar to that in FIG. 4 (blocks 50, 52, 54, 56, 58, 60, and 62). However, rather than relying on an interrupt clear message to clear the virtual interrupt state in the interrupt controller 14, the software executing on the CPU 10A may clear the virtual interrupt state directly (e.g. by writing a control register in the interrupt controller 14 that is mapped to the virtual interrupt state flops 28—block 72). The software may also clear the interrupt mask, as in the embodiment of FIG. 4 (block 70). Additionally, in this embodiment, the interrupt message circuits 22A-22B may support a shadow end of interrupt (EOI) state. The interrupt message circuits 22A-22B may prevent transmission of a new interrupt set message until software writes the EOI state to indicate that the previous interrupt is ended (block 74). If the level-sensitive interrupt signal is still asserted by the corresponding device 24A-24B, the writing of the EOI state results in the transmission of a new interrupt set message.

Figure 6:
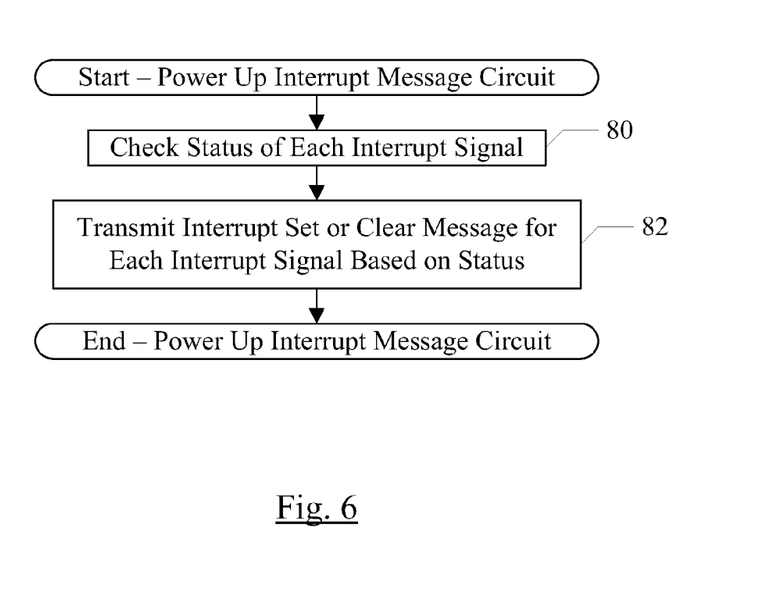
FIG. 6 is a flowchart illustrating operation of one embodiment of an interrupt message circuit during power up.

In some embodiments of the system, particularly SOC embodiments, power management may be employed to power down circuitry that is idle. The power management may enhance battery life in embodiments that are used in mobile devices, and may also aid in thermal management. If a device 24A-24B and/or its interrupt message circuit is powered down, the virtual interrupt state for that device's interrupt may become out of sync with respect to the actual level-sensitive interrupt from the device. Similarly, the virtual interrupt state may become out of sync with a device if the device is reset for any reason. FIG. 6 is a flowchart illustrating operation of one embodiment of the interrupt message circuit 22A-22B responding to a power up event (or reset event) to synchronize (or resynchronize) the virtual interrupt state in the interrupt controller 12 with the actual levels of the level-sensitive interrupts in the system. A power up event may be an event in which the device 24A-24B and/or the interrupt message circuit 22A-22B is powered on after being powered off. In some embodiments, the fabric 14 (or portions thereof) may also be powered up/down. In such embodiments, a power up event may also be the powering up of a portion of the fabric 14 that might have prevented an interrupt message from reaching the interrupt controller 12 (e.g. a portion of the fabric 14 that is in the path between the interrupt message circuit 22A-22B and the interrupt controller 12).

The interrupt message circuit 22A-22B may check the status of each level-sensitive interrupt signal input to that circuit (block 80). In this case, the interrupt message circuit 22A-22B may not be comparing the level of the interrupt signal to the previously-sampled level, but instead may be sensing the current level. The interrupt message circuit 22A-22B may generate and transmit an interrupt set message or interrupt clear message responsive to the status (block 82). In this manner, the virtual interrupt state in the interrupt controller 12 may be updated to the current level of the interrupt signals after a powered-down period in a portion of the system. The virtual interrupt state in the interrupt controller 12 may also be initialized on initial power up of the entire system using this mechanism.

Figure 7:
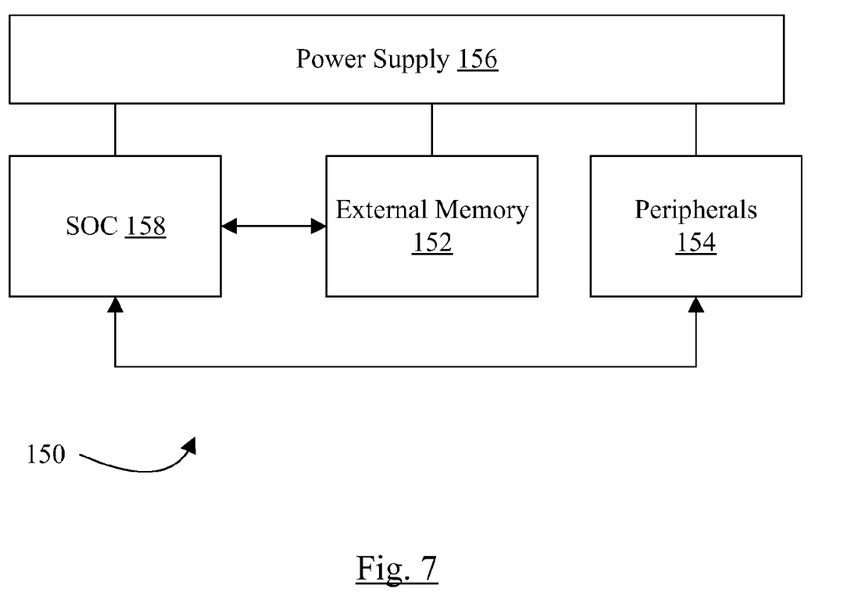
FIG. 7 is a block diagram of a system including an SOC and memory implementing one embodiment of the system illustrating in FIG. 1.

Turning now to FIG. 7, a block diagram of one embodiment of a system 150 is shown. In the illustrated embodiment, the system 150 includes at least one instance of an SOC 158 coupled to one or more peripherals 154 and an external memory 152. A power supply 156 is provided which supplies the supply voltages to the SOC 158 as well as one or more supply voltages to the memory 152 and/or the peripherals 154. In some embodiments, more than one instance of the SOC 158 may be included (and more than one memory 152 may be included as well).

The SOC 158 may include the components of the SOC as described for some embodiments of FIG. 1, above.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

In an embodiment, one or more of the peripherals 154 may be configured to assert interrupts to the SOC 158. The peripheral interface circuit coupled to such a peripheral may be a device 24A-24B in the SOC 158, and the corresponding interrupt message circuit 22A-22B may generate interrupt messages in response to the interrupts. The interrupts may be level-sensitive, in an embodiment.

The external memory 152 may include any type of memory. For example, the external memory 152 may be SRAM, dynamic RAM (DRAM) such as synchronous DRAM (SDRAM), double data rate (DDR, DDR2, DDR3, etc.) SDRAM, RAMBUS DRAM, etc. The external memory 152 may include one or more memory modules to which the memory devices are mounted, such as single inline memory modules (SIMMs), dual inline memory modules (DIMMs), etc. Alternatively, the external memory 152 may include one or more memory devices that are mounted on the SOC 10 in a chip-on-chip or package-on-package implementation. The external memory 152 may include the memory 18 shown in FIG. 1, for example.

Figure 8:
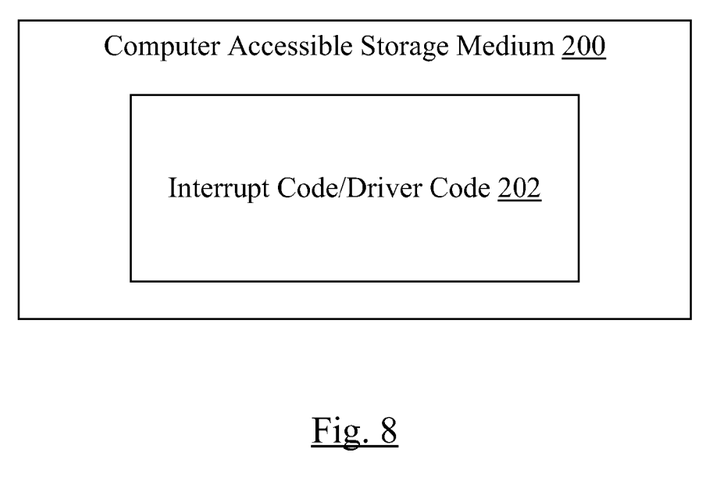
FIG. 8 is a block diagram of one embodiment of a computer accessible storage medium.

Turning now to FIG. 8, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 8 may store the interrupt code/driver code 202. The interrupt code/driver code 202 may include instructions which, when executed by a CPU 10A-10B, implement the operation described for the interrupt code/driver code above, particularly with regard to FIGS. 4 and 5. A carrier medium may include computer accessible storage media as well as transmission media such as wired or wireless transmission.

It is noted that, while the present discussion describes virtualizing a level-sensitive interrupt signal, any level-sensitive signal may be virtualized using the mechanism described herein. A message circuit similar to the interrupt message circuit 22A-22B may generate set and clear messages for the signal, and a receiving circuit similar to the interrupt controller 12 may update its virtual copy in response to the set and clear messages, the message circuit may generate messages at power up events, etc.

Numerous variations and modifications will become apparent to those skilled in the art once the above disclosure is fully appreciated. It is intended that the following claims be interpreted to embrace all such variations and modifications.

What is claimed is:

1. A system comprising:
   a communication fabric;
   a device coupled to the communication fabric, wherein the device is configured to transmit memory operations on the communication fabric, and wherein the device is further configured to generate a level-sensitive signal; and
   a message circuit coupled to receive the level-sensitive signal from the device and configured to detect a change in a level of the level-sensitive signal, wherein, in at least one case, the message circuit receives the change in the level of the level-sensitive signal prior to the device completing transmission of the memory operations, and wherein the message circuit is configured to generate a message indicating the change in level, and wherein the message circuit is configured to transmit the message on the communication fabric, wherein the message circuit is configured to detect a lack of further memory operation transmissions from the device and to transmit the message on the communication fabric subsequent to the memory operations transmitted from the device on the communication fabric.

2. The system as recited in claim 1 wherein the message is one of a set message and a clear message, wherein the set message indicates that the level-sensitive signal has transitioned from low to high, and wherein the clear message indicates that the level-sensitive signal has transitioned from high to low.

3. The system as recited in claim 2 wherein, responsive to a power up event, the message circuit is configured to sense a level of the level-sensitive signal and transmit the message responsive to the sensed level.

4. The system as recited in claim 2 wherein the level-sensitive signal is an interrupt signal, and wherein the system further comprises an interrupt controller coupled to the communication fabric, wherein the interrupt controller is configured to virtualize the interrupt signal responsive to the set and clear messages.

5. The system as recited in claim 4 further comprising at least one processor coupled to the interrupt controller, wherein the interrupt controller is configured to present interrupts to the processor.

6. A method comprising:
   asserting a level-sensitive interrupt signal by a device;
   detecting the asserting in an interrupt message circuit;
   transmitting a set interrupt message by the interrupt message circuit responsive to detecting the asserting;
   receiving the set interrupt message in an interrupt controller;
   setting a virtual interrupt in the interrupt controller responsive to the set interrupt message;
   interrupting a processor by the interrupt controller responsive to the virtual interrupt being set;
   acknowledging the interrupt by the processor responsive to the interrupting;
   servicing the interrupt by the processor responsive to the interrupting;
   clearing the source device by the processor responsive to the servicing, wherein the clearing causes the device to deassert the level-sensitive interrupt signal; and
   clearing the virtual interrupt in the interrupt controller by the processor.

7. The method as recited in claim 6 wherein the acknowledging masks the interrupt in the interrupt controller, and wherein the method further comprises:
   clearing the interrupt mask for the interrupt in the interrupt controller by the processor.

8. The method as recited in claim 7 further comprising:
   maintaining a shadow end of interrupt state corresponding to the interrupt in the interrupt message circuit; and
   updating the shadow end of interrupt state by the processor subsequent to clearing the interrupt mask.

9. The method as recited in claim 7 further comprising:
   deasserting the level-sensitive interrupt signal by the device;
   detecting the deasserting in the interrupt message circuit;
   transmitting a clear interrupt message by the interrupt message circuit responsive to detecting the deasserting;
   receiving the clear interrupt message in an interrupt controller; and
   clearing the virtual interrupt in the interrupt controller responsive to the clear interrupt message.

10. A method comprising:
    asserting a level-sensitive interrupt signal by a device;
    detecting the asserting in an interrupt message circuit;
    transmitting a set interrupt message by the interrupt message circuit responsive to detecting the asserting;
    receiving the set interrupt message in an interrupt controller;
    setting a virtual interrupt in the interrupt controller responsive to the set interrupt message;
    interrupting a processor by the interrupt controller responsive to the set virtual interrupt;
    acknowledging the interrupt by the processor responsive to the interrupting;
    servicing the interrupt by the processor responsive to the interrupting;
    clearing the source device by the processor responsive to the servicing, wherein the clearing causes the device to deassert the level-sensitive interrupt signal;
    detecting the deassertion of the level-sensitive interrupt signal by the interrupt message circuit;
    transmitting a clear interrupt message by the interrupt message circuit responsive to detecting the deasserting;
    receiving the clear interrupt message in the interrupt controller; and
    clearing the virtual interrupt in the interrupt controller responsive to the clear interrupt message.

11. The method as recited in claim 10 wherein the acknowledging masks the interrupt in the interrupt controller.

12. The method as recited in claim 10 further comprising clearing the interrupt mask in the interrupt controller by the processor.

13. A system comprising:
a processor;
an interrupt controller coupled to the processor and configured to present interrupts to the processor;
a communication fabric coupled to the interrupt controller and the processor;
a first device coupled to the communication fabric, wherein the first device is configured to assert a first interrupt for the processor;
a first interrupt message circuit coupled to receive the first interrupt from the first device, wherein the first interrupt message circuit is configured to generate a first interrupt message in response to assertion of the first interrupt and to communicate the first interrupt message over the communication fabric to the interrupt controller;
a second device coupled to the communication fabric, wherein the second device is configured to assert a second interrupt for the processor; and
a second interrupt message circuit coupled to receive the second interrupt from the second device, wherein the second interrupt message circuit is configured to generate a second interrupt message in response to assertion of the second interrupt and to communicate the second interrupt message over the communication fabric to the interrupt controller, and wherein a first path from the first interrupt message circuit to the interrupt controller is at least partially separate from a second path from the second interrupt message circuit to the interrupt controller.

14. The system as recited in claim 13 wherein, in response a deassertion of the first interrupt by the first device, the first interrupt message circuit is configured to transmit a third interrupt message to the interrupt controller.

15. The system as recited in claim 14 wherein the interrupt controller is configured to set a virtual interrupt corresponding to the first interrupt responsive to the first interrupt message, and wherein the interrupt controller is configured to clear the virtual interrupt responsive to the third interrupt message.

16. The system as recited in claim 14 wherein the interrupt controller is configured to cease presenting the interrupt to the processor responsive to clearing the virtual interrupt and responsive to no other interrupts being available for presentation to the processor.

17. A system comprising:
a communication fabric;
an interrupt controller coupled to the communication fabric;
a device coupled to the communication fabric, wherein the device is further configured to generate a level-sensitive interrupt signal; and
an interrupt message circuit coupled to receive the level-sensitive interrupt signal from the device and configured to detect changes in a level of the level-sensitive interrupt signal, wherein the interrupt message circuit is configured to generate messages indicating each change in the level, and wherein the message circuit is configured to transmit the messages on the communication fabric to the interrupt controller; and
wherein the interrupt controller is configured to maintain a virtual interrupt responsive to the messages.

18. The system as recited in claim 17 wherein the messages include an interrupt set message and an interrupt clear message, and wherein the interrupt controller is configured to set the virtual interrupt responsive to the interrupt set message and to clear the virtual interrupt responsive to the interrupt clear message.

19. The system as recited in claim 17 wherein the interrupt message circuit is configured to sense the level of the level-sensitive interrupt signal responsive to a power up event and is configured to transmit a corresponding message to the interrupt controller.

20. The system as recited in claim 19 wherein the power up event is a result of repowering the device and the interrupt message circuit after a power down event for power conservation while the system remains powered.

21. The system as recited in claim 17 wherein the interrupt message circuit is configured to sense the level of the level-sensitive interrupt signal responsive to a reset event and is configured to transmit a corresponding message to the interrupt controller.

22. A system comprising:
a communication fabric;
an interrupt controller coupled to the communication fabric, wherein the interrupt controller comprises a virtual interrupt state that tracks a plurality of level-sensitive interrupts in the system; and
one or more interrupt message circuits coupled to receive the plurality of level-sensitive interrupts and configured to generate interrupt messages to the interrupt controller in response to each change in level of the plurality of level-sensitive interrupt signals, and wherein the one or more interrupt message circuits are configured to sense the levels of the plurality of level-sensitive interrupt signals at power up of the one or more interrupt message circuits, and the one or more interrupt message circuits are configured to transmit corresponding interrupt messages on the communication fabric to the interrupt controller independent of whether or not a change in level is detected, wherein the messages include an interrupt set message and an interrupt clear message, and wherein the interrupt message circuits are configured to transmit the interrupt set message for each of the plurality of level-sensitive interrupt signals that are asserted at power up, and wherein the interrupt message circuits are configured to transmit the interrupt clear message for each of the plurality of level-sensitive interrupt signals that are deasserted at power up.

23. The system as recited in claim 22 wherein the interrupt controller is configured to set a corresponding virtual interrupt responsive to the interrupt set message and to clear the corresponding virtual interrupt responsive to the interrupt clear message.

* * * * *